United States Patent [19]

Lindahl

[11] 4,433,631

[45] Feb. 28, 1984

[54] METHOD AND APPARATUS FOR PRODUCING A USEFUL STREAM OF HOT GAS FROM A FLUIDIZED BED COMBUSTOR WHILE CONTROLLING THE BED'S TEMPERATURE

[75] Inventor: Bruce C. Lindahl, Minneapolis, Minn.

[73] Assignee: FluiDyne Engineering Corporation, Minneapolis, Minn.

[21] Appl. No.: 264,438

[22] Filed: May 18, 1981

[51] Int. Cl.³ ............................................... F23G 5/00
[52] U.S. Cl. .................................. 110/245; 110/347; 432/58
[58] Field of Search ............... 110/245, 347; 122/4 D; 34/57 A; 432/15, 58

[56] References Cited

U.S. PATENT DOCUMENTS

| | | |
|---|---|---|
| 2,479,376 | 8/1949 | Lemaire . |
| 3,190,245 | 6/1965 | Huntington . |
| 3,577,938 | 5/1971 | Muirhead ............................ 110/245 |
| 3,727,563 | 4/1973 | Hasselbring et al. . |
| 3,772,998 | 11/1973 | Menigat ............................. 110/245 |
| 3,777,678 | 12/1973 | Lutes et al. . |
| 3,808,619 | 5/1974 | Vanderveer . |
| 3,907,674 | 9/1975 | Roberts et al. ...................... 110/245 |
| 4,060,041 | 11/1977 | Sowards ............................. 110/245 |
| 4,075,953 | 2/1978 | Sowards ............................. 110/245 |
| 4,103,646 | 8/1978 | Yerushalmi et al. ................ 122/4 D |
| 4,159,000 | 6/1979 | Iwasaki et al. ..................... 110/245 |
| 4,168,670 | 9/1979 | Wall et al. ......................... 110/245 |
| 4,241,672 | 12/1980 | Tuttle ................................ 110/245 |
| 4,324,544 | 4/1982 | Blake ................................ 110/245 |
| 4,325,327 | 4/1982 | Kantesoria et al. ................ 110/245 |

FOREIGN PATENT DOCUMENTS

| | | |
|---|---|---|
| 33808 | of 0000 | European Pat. Off. . |
| 1147899 | of 0000 | United Kingdom . |
| 1326658 | of 0000 | United Kingdom . |
| 1523500 | of 0000 | United Kingdom . |
| 1561237 | of 0000 | United Kingdom . |
| 1567909 | of 0000 | United Kingdom . |
| 2027527 | of 0000 | United Kingdom . |

Primary Examiner—Henry C. Yuen
Attorney, Agent, or Firm—Dorsey & Whitney

[57] ABSTRACT

Method and apparatus are disclosed for producing a useful stream of hot gas from a fluidized bed combustor and controlling bed temperature by introducing cooling gas into the freeboard region of the combustor. The cooling gas is introduced by a plurality of inlet ports located within the combustion chamber or about its periphery. The cooling gas contacts particulate matter in the freeboard region, extracting heat therefrom. Cooled particulate matter either falls back into the bed or is returned to the bed from a separator downstream of the combustion chamber.

7 Claims, 4 Drawing Figures

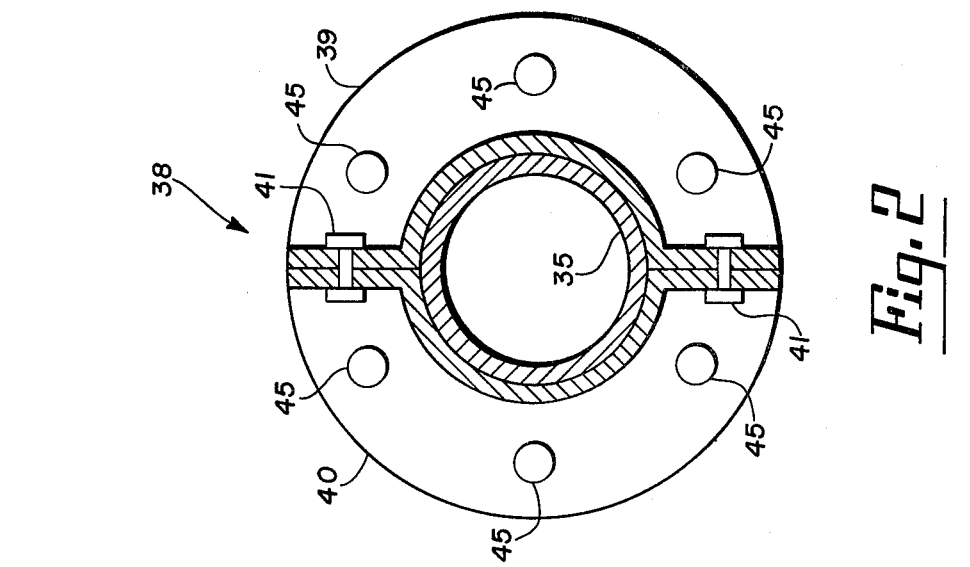
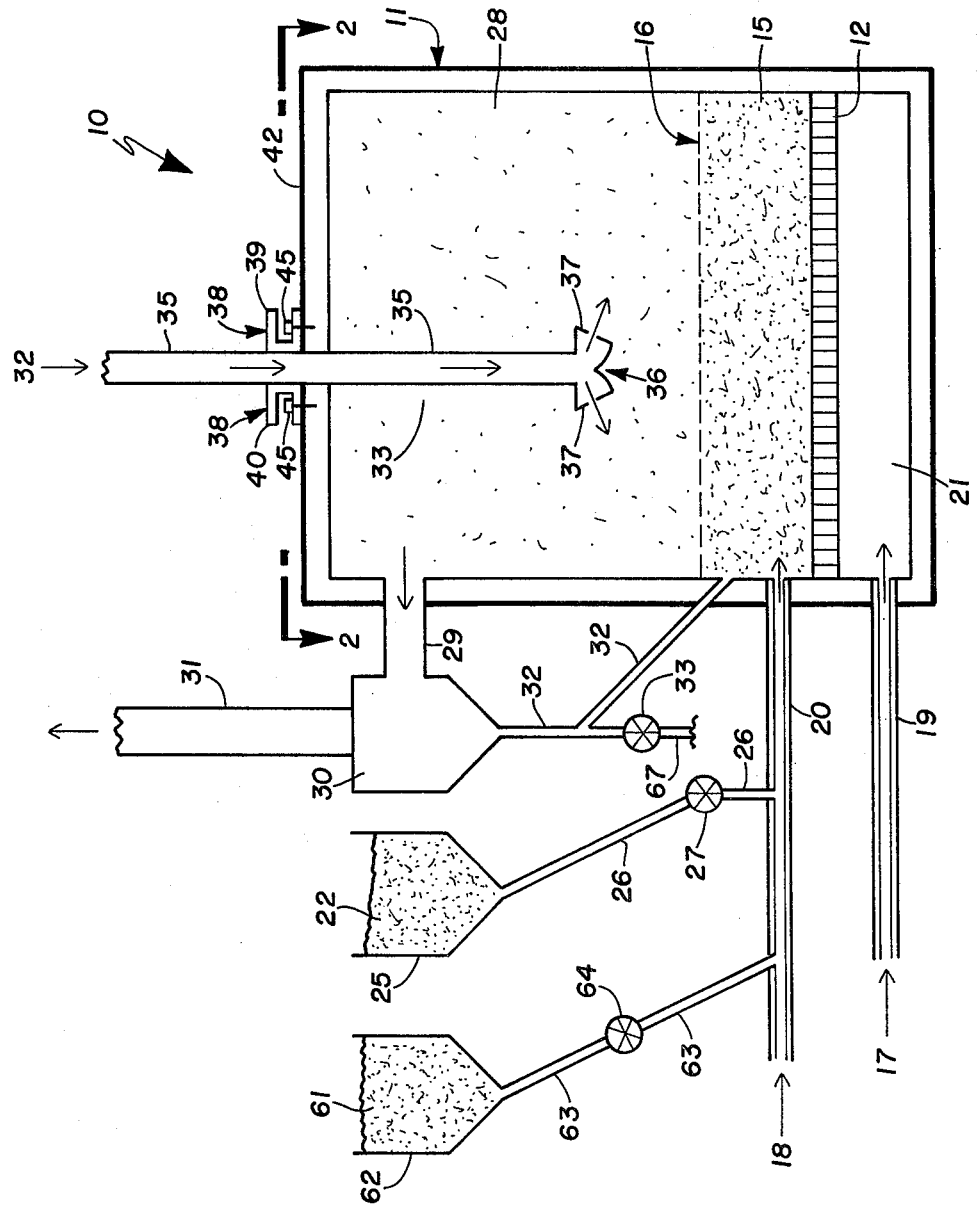

METHOD AND APPARATUS FOR PRODUCING A USEFUL STREAM OF HOT GAS FROM A FLUIDIZED BED COMBUSTOR WHILE CONTROLLING THE BED'S TEMPERATURE

BACKGROUND OF THE INVENTION

1. Field of the Invention

This invention relates to a method for producing a useful stream of hot gas from a fluidized bed combustor while controlling the bed's temperature. The invention further relates to an improved fluidized bed combuster.

2. Description of the Prior Art

Fluidized bed combustors are useful for providing heat for useful purposes. In conventional fluidized bed combustors, a fluidized bed is created by blowing air up through an initially static quantity of particulate matter, such as crushed stone, which partially fills a combustion chamber. By bringing the air flow up to and controlling it within a certain range of velocities, the particles will rise and be sustained in a turbulent suspension, thereby forming a fluidized bed.

Such fluidized beds can provide an ideal environment for the combustion of many materials, including solid fuels such as coal. By preheating a fluidized bed and introducing a fuel (e.g., coal) into the bed at a controlled rate, a self-sustaining combustion reaction can be made to occur. The heat released by such combustion is transferred to the bed material and the air and combustion produce gases which pass through the bed.

Fluidized bed combustors are useful for controlling the emission of undesirable combustion by-products. For example, by injecting a sorbent material such as limestone into the fluidized bed combustor, sulfur dioxide emissions which always accompany the burning of coal can be substantially reduced. This injected sorbent material and its subsequent reaction product (i.e., $CaSO_4$) are solids and become part of the bed material. As bed material is drawn from the bed to control bed height, or as it is elutriated and eventually captured in, for example, a baghouse, the sulfur retained is removed from the system. This dry solid material is often more easily disposed of than the wet sludges resulting from competing downstream desulfurization processes.

The bed temperature of a fluidized bed combustor is generally limited on the upper side by several factors. Most solid fuels of interest have some ash content. Such ashes become sticky and therefore tend to agglomerate at some temperature level (typically somewhere in 1900°–2400° F. range). Even more restrictive, generally, is the temperature requirement for an effective sulfur dioxide reaction with the sorbent. At atmospheric pressure this reaction becomes rapidly less effective as bed temperatures exceed 1650° F.

Almost all fuels of commercial value, including coal, have adiabatic flame temperatures, for stoichiometric proportions of fuel and air, which exceed 1650° F. Most of these adiabatic flame temperatures also exceed the ash fusion value. Consequently, the temperature of a fluidized bed must generally be kept below the stoichiometric adiabatic value by extracting heat from the bed.

Methods for extracting heat from a bed in order to lower its temperature to acceptable levels can also aid the combustor's primary purpose of providing heat for useful purposes. Several known methods for extracting heat from a fluidized bed involve transferring heat from the bed material to a medium. Such transfer of heat from the bed can be utilized to control the bed's temperature. Such transfer of heat to the medium can also be utilized to provide heat for useful purposes by conveying the medium containing such heat to the point of use. The following two are the most common of such methods.

One common method uses heat exchanger surfaces immersed in or bounding the bed. The medium to be heated (i.e. a liquid such as water, a vapor such as steam, or a gas) is passed through the heat exchanger where it receives heat from the bed by conduction through the heat exchanger surfaces. The medium then conveys the heat to the use points. However, although this method is useful, and for some situations even the preferred one, it often adds considerably to the system cost since at even relatively modest temperatures the often corrosive nature of the fluidized bed combustor environment may dictate the use of expensive materials and frequent maintenance.

The second common method for extracting heat from a fluidized bed is simply to pass air through the bed in quantities exceeding the optimal amount required for efficient combustion of the fuel. This excess air along with the combustion products are now the heat conveying medium. The shortcomings of this approach include high power consumption since this extra air must be compressed appreciably to force it through the fluidized bed and the bed's air distribution grid. Another shortcoming is that passing excess air through the bed requires that the bed's cross sectional area be increased relative to the cross sectional area required for efficient combustion, so as not to create excessive gas velocities in the bed. Excessive velocities are those at which any of the following problems occur:

1. Bed blows away rapidly.
2. Combustion efficiency is poor.
3. Sulfur removal by sorbent reaction is poor.
4. Bed depth required for good combustion efficiency or sulfur retention has become excessive.

A larger bed area implies a more costly combustor since it requires a larger more costly air distribution grid with which to introduce air into the bed. Also, the vessel or box which contains the combustor increases in size and cost.

In summary, the commonly used methods for extracting heat from fluidized bed combustors involve significant capital and operating costs.

SUMMARY OF THE INVENTION

The present invention involves a method for extracting useful heat from and controlling the temperature of a fluidized bed combustor by introducing cooling gas (i.e., a gas having a temperature less than bed temperature) into the freeboard region of the combustor. The freeboard region is the space above the bed in the combustion chamber. The present invention further involves an improved fluidized bed combustor having means for introducing cooling gas into the freeboard region of the combustor.

The present invention is particularly useful for producing a useful stream of hot gas. The temperature of this stream of gas can be varied and is limited on the high side by the bed temperature, the gas flow rate and temperature, and the amount of particulate material blown into the freeboard region. The stream of hot gas so produced has a number of potential uses, including for example:

1. Production of steam in a waste heat boiler (being either a new boiler or an old boiler previously fired by some premium fuel such as oil or natural gas);
2. Drying of lumber (by using the stream of gas in lumber dry kiln); and
3. Drying of various minerals (examples are bauxite and coal).

In some situations, cooling gas to be injected into the freeboard region can consist entirely of or partially consist of cooling gas previously heated and routed to and exhausted from the use device. This recycling of cooling gas results in energy savings since cooling gas exhausted from a use device is almost always hotter than ambient temperatures.

The present invention is also particularly useful for controlling the temperature of a fluidized bed by extracting heat from the bed and thereby lowering the bed's temperature significantly below the stoichiometric adiabatic flame temperature of the fuel.

Both the provision of heat for useful purposes and controlling the temperature of a fluidized bed are accomplished by the present invention in the following manner. The freeboard region at any given time contains particulate matter which has been forced up from the bed. In typical fluidized bed combustors of commercial interest, gas passing through the bed does not do so in a uniform fashion. Instead, bubbles (cavities which contain few solids) form and pass up through the bed. These bubbles "burst" at the surface of the bed and throw a spray of particles into the space above the bed. The particles enter this space at the bed temperature.

The gases passing through the bed and the gaseous by-products of the combustion leave the bed at the bed's temperature. Particulate matter thrown into the freeboard region would thus have a temperature equal to the gases exhausting from the bed. A portion of this particulate matter will fall back into the bed. However, because its temperature is the same as that of the bed, this recycling of such particulate matter between the bed and freeboard region will not normally affect the bed's temperature.

Both in its method and apparatus aspects, the present invention provides for the introduction of cooling gas into the freeboard region. Upon introduction into the freeboard region, the cooling gas, which is not significantly involved in the combustion process, contacts some of the hot particulate matter thrown up from the bed. Heat is transferred from the hot particulate matter to the cooling gas, thereby lowering the temperature of the particulate matter while raising the temperature of the cooling gas. Upon being heated, the cooling gas becomes a useful stream of hot gas, adding to the existing stream of hot gas consisting of the gases exhausting from the bed. Thus, the heated cooling gas conveys the heat it received from the particulate matter out of the system where it can be put to use.

Some of the cooled particulate matter will fall back into the bed thereby cooling the bed directly. The remaining portion of the cooled particulate matter leaves the freeboard region with the stream of hot gas consisting of cooling gas and gases exhausting from the bed. This gas stream is then passed through a cyclone or some other solid-from-gas separation device. The solid particulate matter so captured is preferably fed back into the bed at the temperature at which it was captured. Thus, the particulate material, cooled by the cooling gas, is returned to the bed by falling back into the bed or by being captured and fed back into the bed.

Such cooled particulate matter extracts heat from the bed and thereby controls the temperature of the bed.

The rate at which heat will thus be extracted from the fluidized bed depends on the rate and the temperature at which particulate matter is recycled.

The rate at which particulate matter recycles depends principally upon the rate at which such matter is thrown out of the bed and into the freeboard region. This rate is dependent upon the characteristics of the bed and its constituents as well as the flow rate of gas through the bed. The rate at which particulate matter is thrown out of the bed and into the freeboard region is unaffected by the injection of cooling gas into the freeboard region, provided such injection does not disturb the bed. Thus, the overall rate at which particulate matter recycles is unaffected by injecting cooling gas and is determined by bed characteristics and the flow rate of gas through the bed.

The average temperature at which particulate matter returns to the bed depends upon the following factors. First, if cooling gas is injected high above the bed, the average return temperature of the recycling particulate matter will be higher. This occurs because a significant fraction of the particulate matter thrown into the freeboard region will fall back into the bed before it has gone high enough to mix properly with the cooling gas above. Such particulate matter will fall back into the bed before transferring heat to the cooling gas. In this regard, optimal heat transfer is realized by injecting cooling gas at a height above the bed which will assure that cooling gas will contact particulate matter thrown into the freeboard region. Second, the extent and uniformness with which cooling gas mixes with particulate matter thrown out of the bed and the duration of their contact before such matter falls back or is blown out, captured, and fed back into the bed are critical factors in determining the average temperature at which particulate matter returns to the bed. In this regard, optimal heat transfer is realized by the use of a plurality of inlet ports located in the freeboard region or about its periphery whereby cooling gas is introduced in a substantially horizontal or slightly downward direction. An initially small downward velocity component will tend to compensate for the overall vertically upward flow of the gas leaving the bed. Injecting cooling air into the freeboard region in this matter facilitates adequate mixing of cooling gas and recycling particulate matter.

BRIEF DESCRIPTION OF THE DRAWINGS

FIG. 1 is a section of the front view of the preferred embodiment of the present invention.

FIG. 2 is a section of the top view of the preferred embodiment taken along line A—A of FIG. 1.

DESCRIPTION OF THE PREFERRED AND ALTERNATIVE EMBODIMENTS

Figure 3:
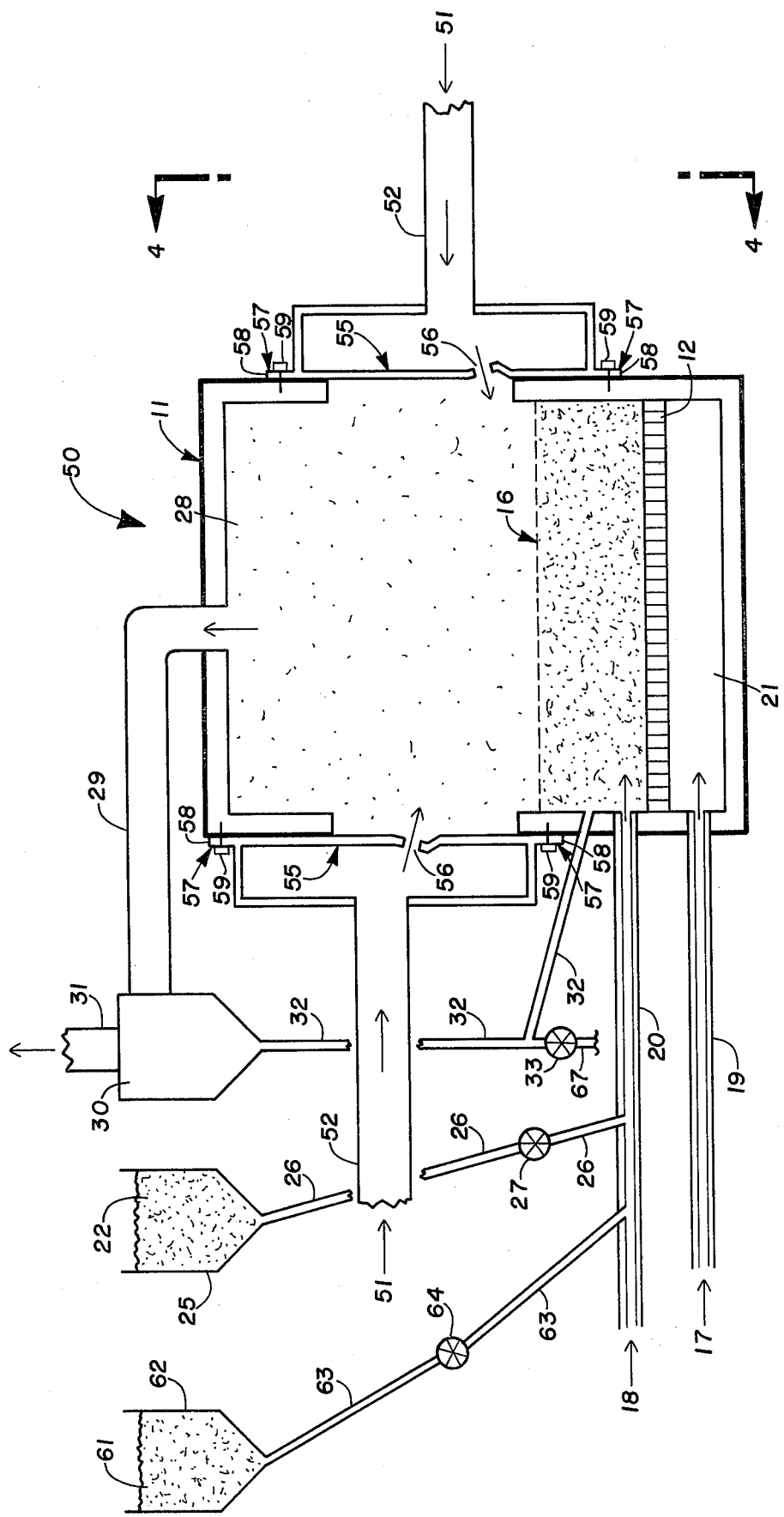
FIG. 3 is a section of the front view of the alternative embodiment of the present invention.

Referring to FIGS. 1 and 3, fluidized bed combustors 10 and 50, constructed according to the preferred and alternative embodiments of the present invention, are described as follows. Combustion chamber 11 is provided with fluidized air distributor 12 on which fluidized bed 15 is located.

Fluidized bed 15 extends to a height indicated by broken line 16 and consists of a turbulent suspension of particulate matter such as crushed stone, preferably a sorbent material such as limestone. Adjustable air source 17 blows air through conduit 19, into lower chamber 21, through fluidized air distributor 12, and thereby fluidized bed 15.

Fuel 22, such as crushed coal, passes from fuel source 25, through conduit 26, to means 27 for metering the quantity of fuel to be injected into bed 15. After passing through metering means 27, fuel 22 is blown through conduit 20 into bed 15 by air from air source 18.

Sorbent material 61, such as crushed limestone or dolomite, passes from sorbent source 62, through conduit 63, to means 64 for metering the quantity of sorbent to be continuously fed into bed 15. Sorbent material 61 is fed into bed 15 by being blown through conduit 20 by air from air source 18. Sorbent material 61 is continuously fed into bed 15 in proportion to the rate at which fuel 22 is fed into bed 15, thereby assuring adequate adsorption of combustion by-products containing sulfur.

Bubbles of fluidizing air and flue gases bursting near the top of bed 15 throw surrounding particulate matter out of bed 15 into freeboard region 28. A substantial portion of the particulate matter forced out of bed 15 falls back into bed 15. The remaining portion of the particulate matter forced out of bed 15 is blown out of combustion chamber 11, through conduit 29, and is captured by separator 30, which may be a cyclone separator. Particulate matter captured by separator 30, except by material to be discarded through dipleg 67 as metered by means 33, passes through dipleg 32 into bed 15. Air, flue gases, and cooling gas exit separator 30 by conduit 31, thereby providing a useful stream of hot gas.

Useful heat is extracted from bed 15 and the temperature of bed 15 is controlled as follows. Particulate matter, forced out of bed 15 by bursting air bubbles initially has a temperature approximately equal to the high temperature of the bed and the air and flue gas passing out of the bed. Upon contact with cooling gas having a relatively lower temperature, heat is transferred from particulate matter to cooling gas with the result that the temperature of the particulate matter is lowered, typically several hundred degrees, and the cooling gas is heated.

Cooled particulate matter falling back into bed 15 is heated by the bed, the amount of heat transferred from bed 15 to the cooler particulate matter falling back into bed 15 being approximately equal to the amount of heat previously transferred from this particulate matter to the cooling gas. Particulate matter blown out of combustion chamber 11 and captured by separator 30 is preferably fed back into bed 15 before it loses significant amounts of heat to the outside environment. Particulate matter fed back into bed 15 is heated by the bed, the amount of heat transferred from bed 15 to the cooler particulate matter fed back into bed 15 being approximately equal to the amount of heat previously transferred from this particulate matter to the cooling gas. Thus, extracting heat from particulate matter in the freeboard region with cooling gas and recycling the cooled particulate matter by gravity or by capturing and feeding it back into bed 15 effects a net transfer of heat from bed 15 to the cooling gas, even though the cooling gas does not contact bed 15. Moreover, this method of extracting heat from bed 15 keeps the bed temperature at an acceptable level even though a high fuel to air ratio results in an excessively high adiabatic flame temperature.

In the following, preferred and alternative embodiment structures for introducing cooling gas into freeboard region 28 are described.

Referring to FIGS. 1 and 2, the preferred embodiment fluidized combustor 10 is further described as follows. Cooling gas from source 32 passes through conduit 35 to interior gas injector 36. Source 32 is adjustable as to the quantity of gas forced through conduit 35 per unit time period. Interior gas injector 36 injects cooling gas in a slightly downward direction into freeboard region 28 through inlet ports 37. Interior gas injector 36 could be constructed to direct cooling gas horizontally or in other directions. The height above bed 15 at which interior gas injector 36 injects cooling gas is determined by means 38, which comprises two half spools 39 and 40 and connecting bolts 41 and 45. Referring to FIG. 2, half spools 39 and 40 are attached to one another by bolts 41, thus forming a seal around conduit 35. Referring to FIG. 1, half spools 39 and 40 are connected to the top surface 42 of combustion chamber 11 by bolts 45, thus forming a seal with top surface 42. The height above bed 15 at which cooling gas is injected is adjusted by loosening bolts 41 and 45 and sliding conduit 35 in or out of combustion chamber 11 until interior gas injector 36 is positioned as desired. Bolts 41 and 45 are then tightened to lock conduit 35 in place.

Figure 4:
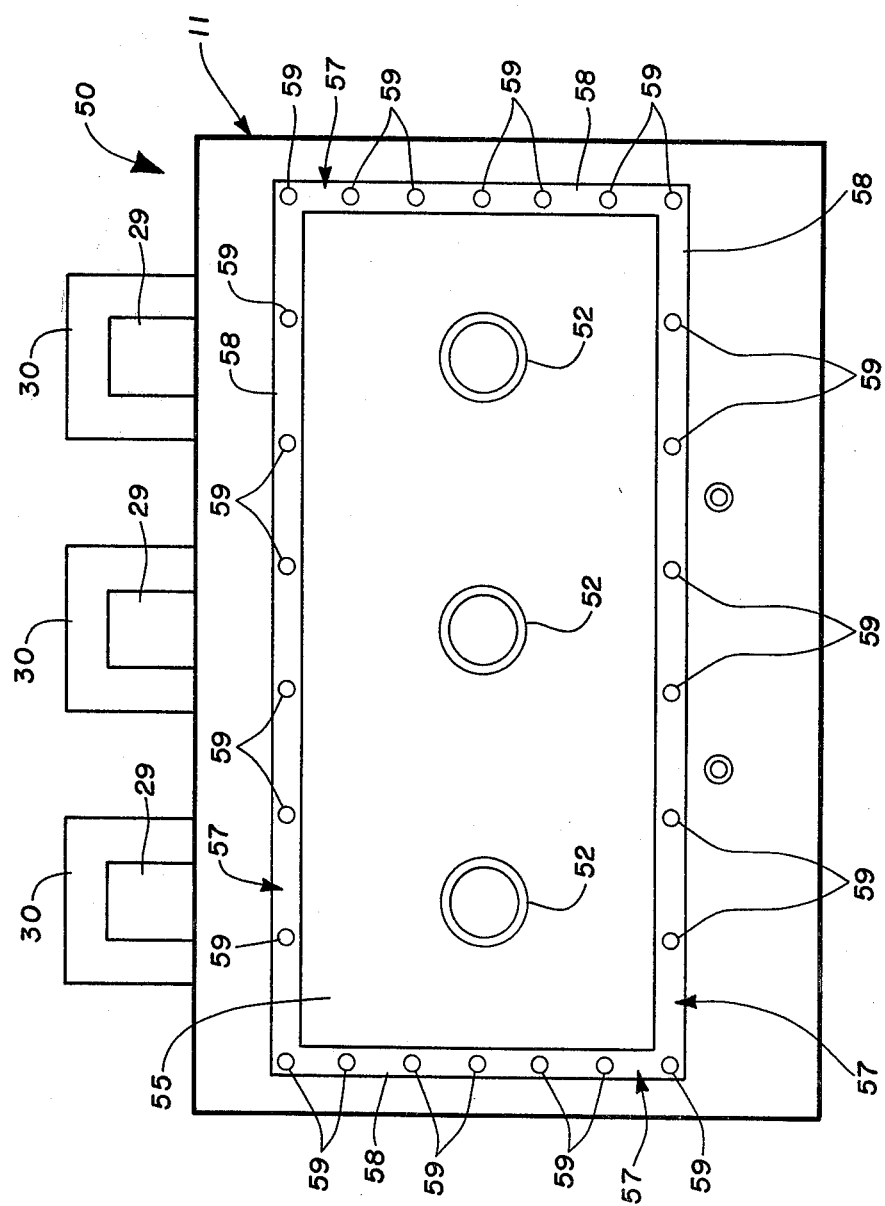
FIG. 4 is a section of the right side view of the alternative embodiment taken along line B—B of FIG. 3.

Referring to FIGS. 3 and 4, the alternative embodiment fluidized bed combustor 50 is further described as follows. Cooling gas from source 51 passes through conduits 52 to peripheral gas injectors 55. Source 51 is adjustable as to the quantity of gas forced through conduit 52 per unit time period. Peripheral gas injectors 55 inject cooling gas in a slightly downward direction into freeboard region 28 through inlet ports 56. Peripheral gas injectors 55 could be constructed to direct cooling gas horizontally or in other directions. The height above bed 15 at which peripheral gas injector 55 injects cooling gas is determined by means 57, which consists of flanges 58 and bolt 59. The height above bed 15 at which cooling gas is injected is adjusted by removing bolts 59 and raising or lowering peripheral injector 55 as desired. Bolts 59 then are inserted to lock injector 55 in place. FIG. 3 shows one peripheral injector 55 at its highest position and the other peripheral injector 55 at its lowest position.

As a further alternative embodiment, the temperature of a fluidized bed can be controlled by utilizing interior and peripheral gas injectors in combination for the same combustion chamber.

In the preferred, alternative, and further alternative embodiments the cooling gas may be air, flue gas, flue gas containing added water vapor, flue gas containing added air and added water vapor, or other gases.

It will be appreciated that in addition to the particular interior gas injector 36 of the preferred embodiment shown in FIG. 1 many other designs of interior gas injectors are within the scope and spirit of the present invention. Similarly, in addition to the particular peripheral gas injector 55 shown in FIG. 3 many other designs of peripheral gas injectors are within the scope and spirit of the invention. Finally, in addition to the particular designs of the preferred and alternative embodiments, many designs of means for adjusting the height above a bed at which cooling gas is injected are within the scope and spirit of the present invention. Accordingly, the scope of the invention is limited only by the appended claims and not limited by the particular designs of the apparatus set forth in the preferred and alternative embodiments.

I claim:

1. A method of producing a useful stream of hot gas from a fluidized bed combustor while controlling the temperature of the bed comprising:
   (1) creating and maintaining a fluidized bed within a combustion chamber, said fluidized bed comprising a turbulent suspension of particulate matter from which particulate matter is thrown into the freeboard region above the bed at a temperature substantially equal to the temperature of the bed;
   (2) introducing fuel into the fluidized bed and combusting substantially completely said fuel in said bed;
   (3) capturing and feeding back into the bed particulate matter blown out of the combustion chamber; and
   (4) introducing cooling gas, which has a temperature relatively lower than bed temperature and at which the cooling gas quenches combustion in the freeboard region, substantially horizontally into the freeboard region and into contact with particulate matter thrown into the freeboard region and lowering the temperature of the particulate matter while raising the temperature of the cooling gas before the particulate matter recycles by falling back into the bed or by being captured and fed into the bed after blowing out of the combustion chamber.

2. The method of claim 1 wherein cooling gas is introduced into the freeboard region in a slightly downward direction.

3. The method of claim 1 or 2 wherein said captured particulate matter is fed back into the bed at substantially the same temperature such particulate matter had upon being blown out of the combustion chamber.

4. The method of claim 1 or 2 wherein cooling gas is introduced into the freeboard region from the periphery of the combustion chamber adjacent to the freeboard region.

5. The method of claim 1 or 2 wherein cooling gas is introduced into the freeboard region from within the freeboard region itself.

6. The method of claim 1 or 2 wherein cooling gas is introduced into the freeboard region both (1) from the periphery of the combustion chamber adjacent to the freeboard region and (2) from within the freeboard region itself.

7. The method of claim 1 or 2 wherein cooling gas is a member of the group consisting of air, flue gas, flue gas containing added air, flue gas containing added water vapor, and flue gas containing added air and added water vapor.

* * * * *